United States Patent [19]
Diachina et al.

[11] Patent Number: 5,633,874
[45] Date of Patent: May 27, 1997

[54] AUTOMATIC RETRANSMISSION REQUEST

[75] Inventors: John W. Diachina, Garner, N.C.; Håkan C. Andersson, Ekerö; Bengt Persson, Djursholm, both of Sweden

[73] Assignee: Telefonaktiebolaget LM Ericsson, Stockholm, Sweden

[21] Appl. No.: 332,114

[22] Filed: Oct. 31, 1994

Related U.S. Application Data

[63] Continuation-in-part of Ser. No. 147,254, Nov. 1, 1993.

[51] Int. Cl.$^6$ .................................................... H04J 3/00
[52] U.S. Cl. ............................................. 370/329; 370/346
[58] Field of Search .................................. 370/95.1–95.3, 370/110.1, 13, 17, 85.8, 60, 60.1, 94.1–94.3, 85.2; 340/825.08, 825.54; 455/33.1, 33.2, 54.1, 54.2; 379/59, 60; 371/32, 33

[56] References Cited

U.S. PATENT DOCUMENTS

| | | | |
|---|---|---|---|
| 4,612,637 | 9/1986 | Davis et al. | 370/95 |
| 4,639,937 | 1/1987 | McRae et al. | 375/40 |
| 4,649,538 | 3/1987 | DeLuca et al. | 371/25 |
| 4,667,193 | 5/1987 | Cotie et al. | 340/825.08 |
| 4,736,371 | 4/1988 | Tejima et al. | 370/95 |
| 4,905,234 | 2/1990 | Childress et al. | 370/94.1 |
| 4,940,974 | 7/1990 | Sojka | 340/825.08 |
| 5,103,445 | 4/1992 | Ostlund | 370/95.2 |
| 5,172,375 | 12/1992 | Kou | 370/95.3 |
| 5,222,061 | 6/1993 | Doshi et al. | 370/13 |
| 5,235,592 | 8/1993 | Cheng et al. | 370/85.4 |
| 5,353,332 | 10/1994 | Raith et al. | 379/59 |
| 5,420,864 | 5/1995 | Dahlin et al. | 370/95.3 |

FOREIGN PATENT DOCUMENTS

| | | |
|---|---|---|
| 321 454 | 6/1989 | European Pat. Off. . |
| 336 079 | 10/1989 | European Pat. Off. . |
| 462 572 | 12/1991 | European Pat. Off. . |
| 60-152144 | 8/1985 | Japan . |
| 60-248039 | 12/1985 | Japan . |
| 2 063 011 | 5/1981 | United Kingdom . |

OTHER PUBLICATIONS

M.P. Moroney et al., "Multiple Access Protocols for Indoor Wireless Communications," *IEEE International Conference on Selected Topics in Wireless Communications*, Jun. 25–26 1992.

"A New Standard for North American Digital Cellular", Magnus Isaksson et al., *Ericsson Review*, No. 2, pp. 58–69 (1994).

"Idle–Signal Casting Multiple Access With Data Slot Reservation (ICMA–DR) for Packet Radio Communications", Atsuchi Murase et al., *IEEE Transactions on Vehicular Technology*, vol. 38, No. 2, pp. 50–54, (May 1989).

"Cellular System Dual–Mode Mobile Station—Base Station Compatibility Standard", *EIA/TIA Interim Standard*, IS–54–B, pp. 101–106; 109–116; 139–140; and 163–166 (Apr., 1992).

*Primary Examiner*—Douglas W. Olms
*Assistant Examiner*—Ajit Patel
*Attorney, Agent, or Firm*—Burns, Doane, Swecker & Mathis, L.L.P.

[57] ABSTRACT

A method for obtaining a report from a mobile station on the status of frames comprising an entire message transmitted to the mobile station is disclosed. First, a polling request is sent to the mobile station from a base station. A status report is then sent to the base station. The polling request specifies whether the mobile station should send the status report on a reservation basis (using a reserved frame) or on a contention basis (using an idle frame). The mobile station then transmits a bit map to the communication system to indicate which frames have been correctly received by the mobile station at the point when it received the polling request.

11 Claims, 9 Drawing Sheets

| BU<br>=XXX | PCON<br>= X | BCN<br>= X | PFM<br>= X | SMSN<br>= X |
|---|---|---|---|---|
| 3 | 1 | 1 | 1 | 1 |

Fig. 5a

| BT<br>=XXX | IDT<br>= XX | MM<br>= X | OI<br>= X |
|---|---|---|---|
| 3 | 2 | 1 | 1 |

Fig. 5b

| Header A<br>(BU=100) | Header B<br>(BT=101) | MSID1<br>= X..X | PE<br>= X..X | TID<br>= XX | L3LI1<br>= X..X | L3DATA1<br>= X..X | CRC<br>= X..X |
|---|---|---|---|---|---|---|---|
| 7 | 7 | 7 | 2 | 8 | | 16 | |

Fig. 8

| Header A<br>(BU=100) | Header B<br>(BT=110) | PE<br>= X..X | TID<br>= X..X | FRNO<br>= X..X | L3DATA1<br>= X..X | CRC<br>= X..X |
|---|---|---|---|---|---|---|
| 7 | 7 | 7 | 2 | 5 | | 16 |

Fig. 9

AUTOMATIC RETRANSMISSION REQUEST

This application is a continuation in part of U.S. patent application Ser. No. 08/147,254, entitled "A Method for Communicating in a Wireless Communication System," which was filed on Nov. 1, 1993, and which is incorporated in this application by reference.

BACKGROUND

The present invention relates to a method for transmitting messages between mobile stations and a central switching system, and more particularly to transmitting these messages using a more efficient communications link protocol over the air-interface of a cellular telephone system.

In a typical cellular radio system, a geographical area, e.g., a metropolitan area, is divided into several smaller, contiguous radio coverage areas called "cells." The cells are served by a series of fixed radio stations called "base stations." The base stations are connected to and controlled by a mobile services switching center (MSC). The MSC, in turn, is connected to the landline (wireline) public switched telephone network (PSTN). The telephone users (mobile subscribers) in the cellular radio system are provided with portable (hand-held), transportable (hand-carried) or mobile (car-mounted) telephone units (mobile stations) which communicate voice and/or data with the MSC through a nearby base station. The MSC switches calls between and among wireline and mobile subscribers, controls signalling to the mobile stations, compiles billing statistics, and provides for the operation, maintenance and testing of the system.

FIG. 1 illustrates the architecture of a conventional cellular radio system built according to the Advanced Mobile Phone Service (AMPS) standard. In FIG. 1, an arbitrary geographic area may be seen divided into a plurality of contiguous radio coverage areas, or cells, C1–C10. While the system of FIG. 1 is, for illustration purposes, shown to include only ten cells, the number of cells may be much larger in practice. Associated with and located in each of the cells C1–C10 is a base station designated as a corresponding one of a plurality of base stations B1–B10. Each of the base stations B1–B10 includes a plurality of channel units, each comprising a transmitter, a receiver and a controller, as is well known in the art.

In FIG. 1, the base stations B1–B10 are located at the center of the cells C1–C10, respectively, and are equipped with omni-directional antennas transmitting equally in all directions. In this case, all the channel units in each of the base stations B1–B10 are connected to one antenna. However, in other configurations of the cellular radio system, the base stations B1–B10 may be located near the periphery, or otherwise away from the centers of the cells C1–C10 and may illuminate the cells C1–C10 with radio signals directionally. For example, the base station may be equipped with three directional antennas, each one covering a 120 degrees sector cell as shown in FIG. 2. In this case, some channel units will be connected to one antenna covering one sector cell, other channel units will be connected to another antenna covering another sector cell, and the remaining channel units will be connected to the remaining antenna covering the remaining sector cell. In FIG. 2, therefore, the base station serves three sector cells. However, it is not always necessary for three sector cells to exist and only one sector cell needs to be used to cover, for example, a road or a highway.

Returning to FIG. 1, each of the base stations B1–B10 is connected by voice and data links to a mobile switching center (MSC) 20 which is, in turn, connected to a central office (not shown) in the public switching telephone network (PSTN), or a similar facility, e.g., an integrated system digital network (ISDN). The relevant connections and transmission modes between the mobile switching center MSC 20 and the base stations B1–B10, or between the mobile switching center MSC 20 and the PSTN or ISDN, are well known to those of ordinary skill in the art and may include twisted wire pairs, coaxial cables, fiber optic cables or microwave radio channels operating in either analog or digital mode. Further, the voice and data links may either be provided by the operator or leased from a telephone company (telco).

With continuing reference to FIG. 1, a plurality of mobile stations M1–M10 may be found within the cells C1–C10. Again, while only ten mobile stations are shown in FIG. 1, the actual number of mobile stations may be much larger in practice and will generally exceed the number of base stations. Moreover, while none of the mobile stations M1–M10 may be found in some of the cells C1–C10, the presence or absence of the mobile stations M1–M10 in any particular one of the cells C1–C10 depends on the individual desires of each of the mobile subscribers who may travel from one location in a cell to another or from one cell to an adjacent or neighboring cell.

Each of the mobile stations M1–M10 includes a transmitter, a receiver, a controller and a user interface, e.g., a telephone handset, as is well known in the art. Each of the mobile stations M1–M10 is assigned a mobile identification number (MIN) which, in the United States, is a digital representation of the telephone directory number of the mobile subscriber. The MIN defines the subscription of the mobile subscriber on the radio path and is sent from the mobile station to the MSC 20 at call origination and from the MSC 20 to the mobile station at call termination. Each of the mobile stations M1–M10 is also identified by an electronic serial number (ESN) which is a factory-set, "unchangeable" number designed to protect against the unauthorized use of the mobile station. At call origination, for example, the mobile station will send the ESN to the MSC 20. The MSC 20 will compare the received ESN to a "blacklist" of the ESNs of mobile stations which have been reported to be stolen. If a match is found, the stolen mobile station will be denied access.

Each of the cells C1–C10 is allocated a subset of the radio frequency (RF) channels assigned to the entire cellular system by the concerned government authority, e.g., the Federal Communications Commission (FCC) in the United States. Each subset of RF channels is divided into several voice or speech channels which are used to carry voice conversations, and at least one paging/access or control channel which is used to carry supervisory data messages, between each of the base stations B1–B10 and the mobile stations M1–M10 in its coverage area. Each RF channel comprises a duplex channel (bidirectional radio transmission path) between the base station and the mobile station. The RF channel consists of a pair of separate frequencies, one for transmission by the base station (reception by the mobile station) and one for transmission by the mobile station (reception by the base station). Each channel unit in the base stations B1–B10 normally operates on a preselected one of the radio channels allocated to the corresponding cell, i.e., the transmitter (TX) and receiver (RX) of the channel unit are tuned to a pair of transmit and receive frequencies, respectively, which does not change. The transceiver (TX/RX) of each mobile station M1–M10, however, may tune to any of the radio channels specified in the system.

In typical land line systems, remote stations and control centers are connected by copper or fiber optic circuits which have a data throughput capacity and performance integrity that is generally significantly better than the data throughput capacity and performance integrity provided by an air interface in a cellular telephone system. As a result, the conciseness of overhead required to manage any selected communication link protocol for land line systems is of secondary importance. In cellular telephone systems, an air interface communications link protocol is required in order to allow a mobile station to communicate with a cellular switching system. A communications link protocol is used to initiate and to receive cellular telephone calls.

The electromagnetic spectrum available for use by cellular telephone systems is limited and is divided into units called channels. Individual channels are used as communication links either on a shared basis or on a dedicated or reserved basis. When individual channels are used as communication links on a shared basis, multiple mobile stations may either listen to or contend for the same channels. In the contending situation, each shared channel can be used by a plurality of mobile stations which compete to obtain exclusive use of the channel for a limited period of time. On the other hand, when individual channels are used as communication links on a dedicated basis, a single mobile station is assigned the exclusive use of the channel for as long as it needs it.

In light of the generally reduced data throughput capacity and performance integrity afforded by an individual channel in a channel sharing situation in a cellular telephone environment, the selection of an efficient air interface protocol to serve as the basis of the communication link becomes paramount.

The communication link protocol is commonly referred to as a layer 2 protocol within the communications industry and its functionality includes the delimiting or framing of higher level messages. Traditional layer 2 protocol framing mechanisms of bit stuffing and flag characters are commonly used in land line networks today to frame higher layer messages, which are referred to as layer 3 messages. These layer 3 messages may be sent between communicating layer 3 peer entities residing within mobile stations and cellular switching systems.

In cellular systems, the likelihood of successfully sending a message over a radio channel is inversely proportional to the length of the message since the entire message will be considered to be in error even if only a single bit of the transmitted message is received in error. In order to address this problem, messages are first divided into small packets or frames. Thus, it becomes important for the cellular system to know if all of the transmitted packets are correctly received by a mobile station.

SUMMARY

According to the present invention, in order to make this determination a base station may send a mobile station any given number of frames using automatic retransmission request (ARQ) wherein the base station may ask the mobile station to send a current status report on the frames it has received and then resend any frames not received correctly. For example, the mobile station can be asked to identify what frames it has received at any point during an ARQ based transmission or the mobile station can autonomously send a message to the base station stating what frames it has received.

According to one embodiment of the present invention, a method for obtaining a report from a mobile station on the status of frames comprising an entire message transmitted to the mobile station is disclosed. First, a status request is sent to the mobile station from a base station. A status report is then sent to the base station. The status request specifies whether the mobile station should send the status report on a reservation basis (i.e., using a reserved frame) or on a contention basis (i.e., using an idle frame). The mobile station then transmits a bit map to the communication system to indicate which frames have been correctly received by the mobile station at the point in time when it received the status request.

BRIEF DESCRIPTION OF THE DRAWINGS

The present invention will now be described in more detail with reference to preferred embodiments of the invention, given only by way of example, and illustrated in the accompanying drawings, in which:

FIGS. 5a–b illustrate SPACH Header sections A and B, respectively, according to one embodiment of the present invention;

FIG. 8 illustrates an ARQ Mode Begin frame according to one embodiment of the present invention; and FIG. 9 illustrates an ARQ Mode Continue frame according to one embodiment of the present invention.

DETAILED DESCRIPTION

Although the description hereinafter focuses on systems which comply with IS-54B and its successors, the principles of the present invention are equally applicable to a variety of wireless communication systems, e.g., cellular and satellite radio systems, irrespective of the particular mode of operation (analog, digital, dual-mode, etc.), the access technique (FDMA, TDMA, CDMA, hybrid FDMA/TDMA/CDMA, etc.), or the architecture (macrocells, microcells, picocells, etc.). As will be appreciated by one skilled in the art, the logical channel which carries speech and/or data may be implemented in different ways at the physical layer level. The physical channel may be, for example, a relatively narrow RF band (FDMA), a time slot on a radio frequency (TDMA), a unique code sequence (CDMA), or a combination of the foregoing. For purposes of the present invention, the term "channel" means any physical channel which can carry speech and/or data, and is not limited to any particular mode of operation, access technique or system architecture.

This application contains subject matter which is related to co-pending U.S. patent application Ser. No. 07/955,591, entitled "Method and Apparatus for Communication Control in a Radiotelephone System," filed on Oct. 2, 1992, to co-pending U.S. patent application Ser. No. 07/956,640, entitled "Digital Control Channel," filed on Oct. 5, 1992, to co-pending U.S. patent application Ser. No. 08/047,452, entitled "Layer 2 Protocol for the Random Access Channel and the Access Response Channel," filed on Apr. 19, 1993, to co-pending U.S. patent application Ser. No. 08/147,254, entitled "A Method For Communicating in a Wireless Communication System," filed on Nov. 1, 1993, to co-pending U.S. patent application Ser. No. 07/967,027, entitled "Multi-Mode Signal Processing," filed on Oct. 27, 1992, and to co-pending U.S. patent application Ser. No. 08/140,467, entitled "A Method of Effecting Random Access in a Mobile Radio System," filed on Oct. 25, 1993. These six co-pending applications are incorporated herein by reference.

Figure 1:
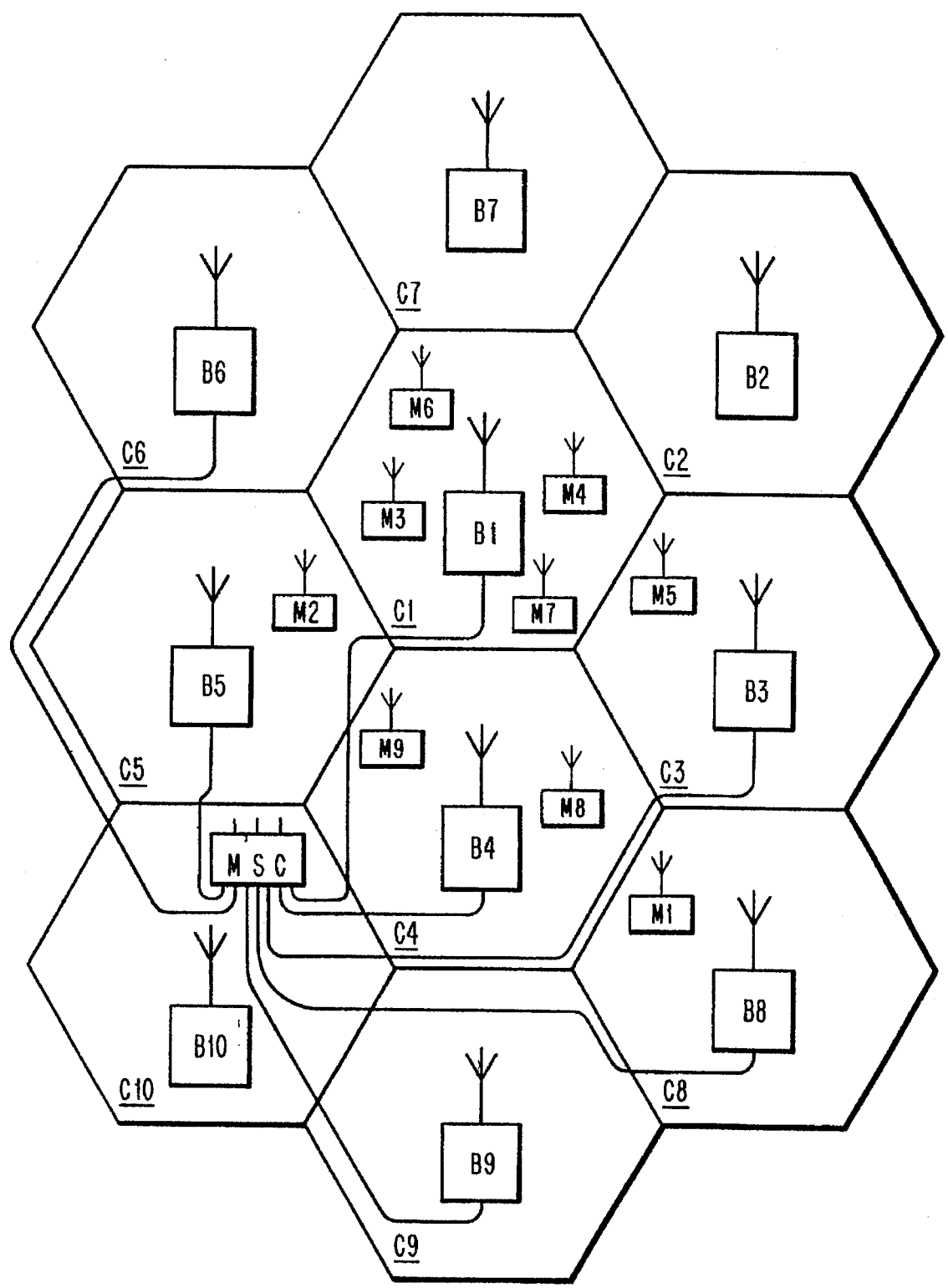
FIG. 1 illustrates the architecture of a conventional cellular radio system.
Figure 2:
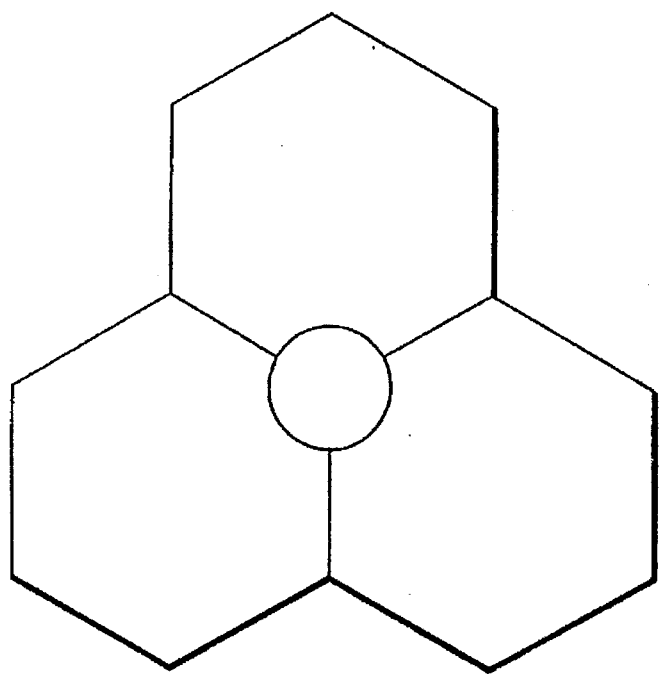
FIG. 2 illustrates a three sector cell which may be used in the system shown in FIG. 1.
Figure 3:
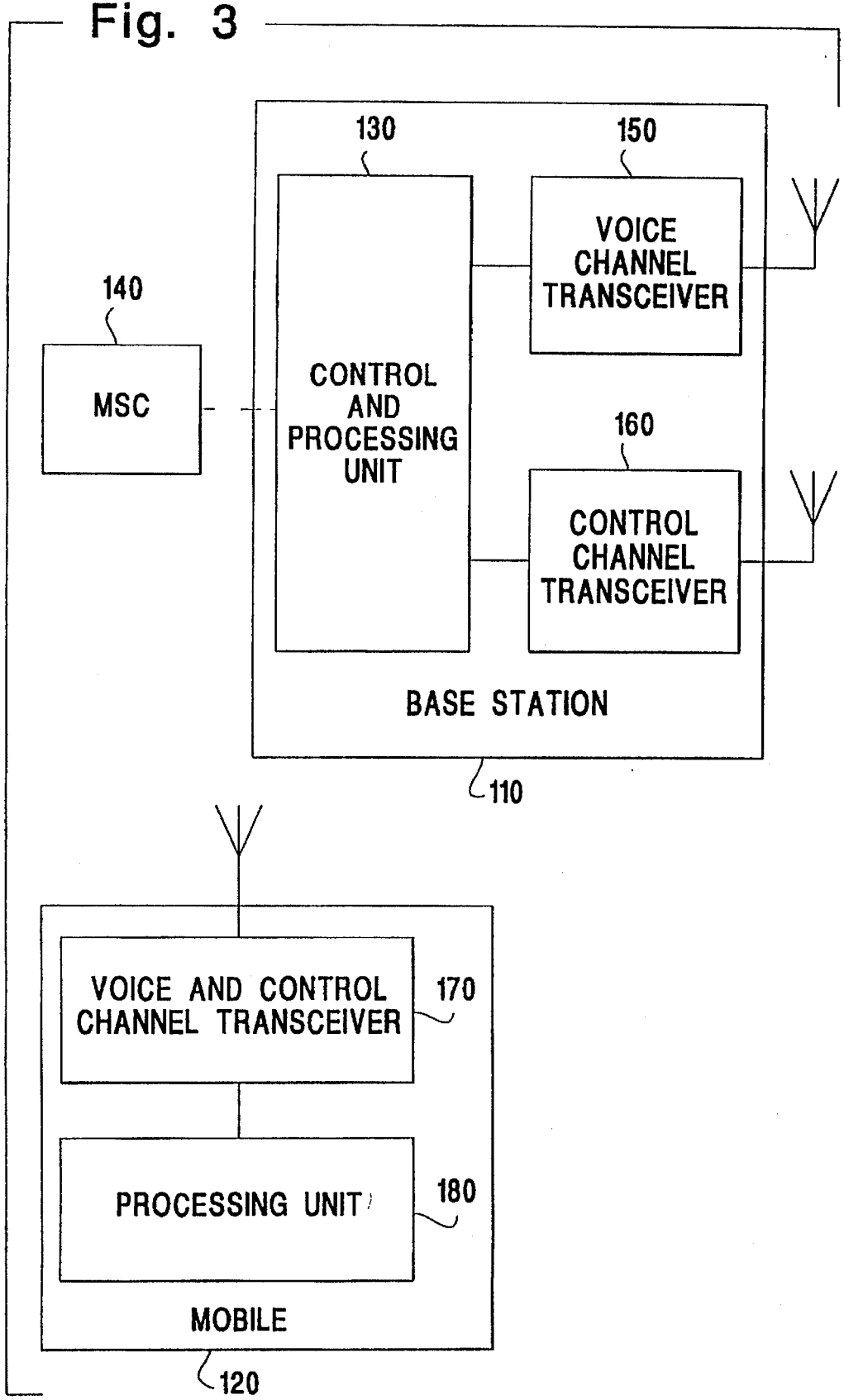
FIG. 3 illustrates a block diagram of an exemplary cellular mobile radio telephone system.

FIG. 3 represents a block diagram of an exemplary cellular mobile radiotelephone system according to one embodiment of the present invention. The system shows an exemplary base station 110 and a mobile station 120. The base station includes a control and processing unit 130 which is connected to the mobile switching center MSC 140 which in turn is connected to the public switched telephone network (not illustrated).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 is in an idle mode, the mobile periodically scans the control channels of base stations like base station 110 to determine which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock onto. The received control channel information not only includes absolute information concerning the cell with which it is associated, but also contains relative information concerning other cells proximate to the cell which the control channel is associated.

For a better understanding of the structure and operation of the present invention, the digital control channel (DCC) may be divided into three layers: layer 1 (the physical layer), layer 2 and layer 3. The physical layer defines the parameters of the physical communications channel, e.g., RF spacing, modulation characteristics, etc. Layer 2 (L2) defines the techniques necessary for the accurate transmission of information within the constraints of the physical channel, e.g., error correction and detection, etc. Layer 3 (L3) defines the procedures for reception and processing of information transmitted over the physical channel.

Figure 4:
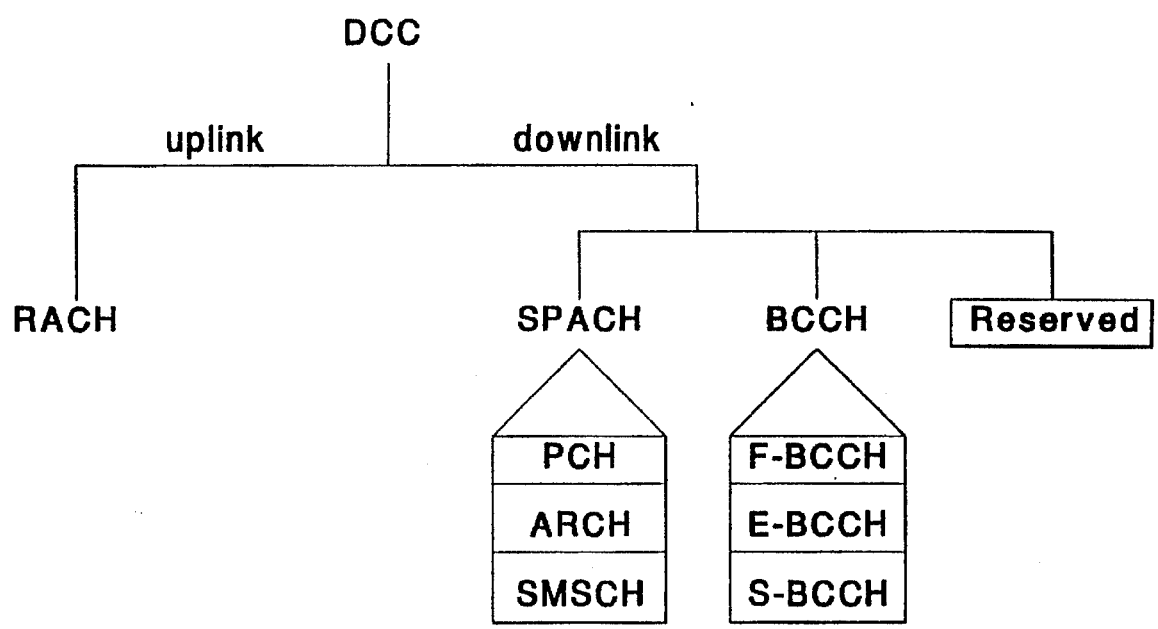
FIG. 4 illustrates the logical channels which make up the digital control channel according to one embodiment of the present invention.

According to the present invention, the DCC is comprised of the logical channels shown in FIG. 4. The DCC logical channels include: the broadcast control channel (BCCH) (which is further comprised of the fast broadcast control channel F-BCCH, the extended broadcast control channel E-BCCH, and the short message service broadcast control channel S-BCCH); the SPACH which includes a short message service point to point channel (SMSCH), a paging channel (PCH) and an access response channel (ARCH); and a random access control channel (RACH).

The BCCH acronym is used to refer collectively to the F-BCCH, E-BCCH, and S-BCCH logical channels. These three logical channels are used, in general, to carry generic, system-related information. Some attributes of these three channels are: unidirectional (i.e., downlink), shared, point-to-multipoint (i.e., broadcast), and unacknowledged. The fast BCCH is a logical channel used to broadcast, for example, time critical system information. The extended BCCH is a logical channel used to broadcast, for example, system information that is less time critical than the information sent on the F-BCCH. The short message service BCCH is a logical channel that is used to broadcast, for example, short messages used for the SMS broadcast service.

The SPACH channel is a logical channel that includes the SMSCH, PCH and ARCH and is used to send information to specific mobile stations for SMS point-to-point, paging and access response purposes. The paging channel PCH is a subset of the SPACH used to deliver pages and orders. The access response channel ARCH is a subset of the SPACH to which the mobile station may autonomously move upon successful completion of an access on a random access channel. The ARCH may be used to convey analog voice channel or digital traffic channel assignments or other responses to a mobile access attempt. Layer 2 automatic retransmission requests are possible for the ARCH and SMSCH using acknowledgement flames sent on the RACH. The SMS point-to-point channel SMSCH is used to deliver short messages to a specific mobile station receiving SMS services. The attributes of the SPACH are: unidirectional (downlink) and shared. The PCH is point-to-multipoint and unacknowledged. The ARCH and SMSCH are point-to-point and may be acknowledged or unacknowledged.

The random access channel RACH is used to request access to the system. The attributes of this channel are unidirectional (uplink), shared, point-to-point, and acknowledged. Contention resolution and/or collision avoidance information is provided on the forward subchannel corresponding to any given frame sent on the RACH.

The SPACH layer 2 protocol can be used whenever a TDMA burst is used to carry point-to-point SMS, Paging, or ARCH information. A single SPACH layer 2 protocol frame can be constructed so as to fit, for example, within a 125 bit envelope. Additional bits (e.g., five) are reserved for use as tail bits resulting in a total of 130 bits of information carried within each slot assigned for SPACH purposes. A summary of the possible SPACH formats is provided in the first table below. A summary of the fields comprising layer 2 protocol frames for SPACH operation is provided in the second table below.

Similar frame formats can be used for the SPACH channels such that the frames will have a common Header A. The contents of the Header A determine whether or not additional information, known as Header B, is present in any given SPACH frame. The Header A discriminates between hard (dedicated) page frames, PCH frames, ARCH frames and SMSCH frames. A Hard Triple Page frame containing three 34-bit mobile station identifications MSIDs can be sent on the PCH (Burst Usage BU=Hard Triple Page). A Hard Quadruple Page frame containing four 20 bit or 24 bit MSIDs can also be sent on the PCH (BU=Hard Quadruple Page).

One or more L3 messages may be transmitted in one frame, or continued over many frames. MSIDs are only carried within frames where BU=Hard, Triple Page, Hard Quadruple Page, and ARQ Mode BEGIN in addition to BU=PCH, ARCH and SMSCH where the Burst Type BT may be set to Single MSID, Double MSID, Triple MSID or Quadruple MSID. The mobile station identity type (IDT) field identifies the format of all MSIDs carried within a given SPACH frame (i.e., no mixing of MSID formats is allowed). Pages carried on the PCH are not allowed to continue beyond a single SPACH frame (even though the protocol allows for it). All other PCH messages may continue beyond a single SPACH frame.

For non ARQ mode operation, the L2 SPACH protocol supports sending a single L3 message to multiple MSIDs in addition to the fixed one-to-one relationship between MSIDs and L3 messages. The Message Mapping field (MM) is used to control this aspect of the layer 2 frame operation. A valid SPACH frame requires that all L2 header information pertinent to a given L2 frame be included entirely within that frame, i.e., L2 header from a given SPACH frame cannot wrap into another SPACH frame. The Offset Indicator field (OI) is used to allow both the completion of a previously started layer 3 message and the start of a new layer 3 message to occur within a single SPACH frame.

The following table summarizes possible SPACH formats:

|   | SMS | PCH | ARCH | CAN BE CONTINUED |
|---|---|---|---|---|
| Single MSID | Y | Y | Y | Y |
| Double MSID | N | Y | Y | Y |
| Triple MSID | N | Y | Y | Y |

|   | SMS | PCH | ARCH | CAN BE CONTINUED |
|---|---|---|---|---|
| Quadruple MSID | N | Y | Y | Y |
| Hard Triple Page (MIN) | N | Y | N | N |
| Hard Quadruple Page (TMSI) | N | Y | N | N |
| Continue | Y | Y | Y | Y |
| ARQ Mode BEGIN | Y | N | Y | Y |
| ARQ Mode CONTINUE | Y | N | Y | Y |

FIG. 5a illustrates the SPACH Header A according to one embodiment of the present invention. The SPACH Header A contains burst usage information and flags for managing mobile stations in a sleep mode. The BU field provides a high level indication of burst usage. According to the present invention, the operation performed on each SPACH channel is not predetermined. The BU field indicates whether the burst is being used for paging, access response, or short message services. The flags indicate changes in sleep mode configuration as well as broadcast control channel information. This header can be present in all possible SPACH frame types. FIG. 5b illustrates the SPACH Header B according to one embodiment of the present invention. The SPACH Header B contains supplementary header information used to identify the remaining content of the layer 2 frame. This header is present when Header A indicates a burst usage of type PCH, ARCH or SMSCH.

The following table summarizes the SPACH Layer 2 Protocol fields:

| Field Name | Length (bits) | Values |
|---|---|---|
| BU = Burst Usage | 3 | 000 = Hard Triple Page (34 bit MSID) |
|  |  | 001 = Hard Quad Page (20 or 24 bit MSID) |
|  |  | 010 = PCH Burst |
|  |  | 011 = ARCH Burst |
|  |  | 100 = SMSCH Burst |
|  |  | 101 = Reserved |
|  |  | 110 = Reserved |
|  |  | 111 = Null |
| PCON = PCH Continuation | 1 | 0 = No PCH Continuation |
|  |  | 1 = PCH Continuation, Activated |
| BCN = BCCH Change Notification | 1 | Transitions whenever there is a change in F-BCCH information. |
| SMSN = SMS Notification | 1 | Transitions whenever there is a change in S-BCCH information. |
| PFM = Paging Frame Modifier | 1 | 0 = Use assigned PF |
|  |  | 1 = Use one higher than assigned PF |
| BT = Burst Type | 3 | 000 = Single MSID Frame |
|  |  | 001 = Double MSID Frame |
|  |  | 010 = Triple MSID Frame |
|  |  | 011 = Quadruple MSID Frame |
|  |  | 100 = Continue Frame |
|  |  | 101 = ARQ Mode Begin |
|  |  | 110 = ARQ Mode Continue |
|  |  | 111 = Reserved |
| IDT = Identity Type | 2 | 00 = 20 bit TMSI |
|  |  | 01 = 24 bit MINI per IS-54B |
|  |  | 10 = 34 bit MIN per IS-54B |
|  |  | 11 = 50 bit IMSI |
| MSID = Mobile Station Identity | 20/24/34/50 | 20 bit TMSI |
|  |  | 24 bit MINI |
|  |  | 34 bit MIN |
|  |  | 50 bit IMSI |
| MM = Message Mapping | 1 | 0 = One instance of L3LI and L3DATA per instance of MSID. |

-continued

| Field Name | Length (bits) | Values |
| --- | --- | --- |
| OI = Offset Indicator | 1 | 1 = One instance of L3LI and L3DATA for multiple MSIDS. 0 = No message offset included. 1 = Message offset included. |
| CLI = Continuation Length Indicator | 7 | Number of bits remaining in the previous L3 message. |
| L3LI = Layer 3 Length Indicator | 8 | Variable length layer 3 messages supported up to a maximum of 255 octets. |
| L3DATA = Layer 3 Data | Variable | Contains a portion (some or all) of the layer 3 message having an overall length as indicated by L3LI. The portion of this field not used to carry layer 3 information is filled with zeros. |
| PE = Partial Echo | 7 | The 7 least significant bits of the mobile station IS-54B MIN. |
| TID = Transaction Identity | 2 | Indicates which ARQ mode transaction is being transmitted on the ARCH or SMSCH. |
| FRNO = Frame Number | 5 | Uniquely identifies specific frames sent in support of an ARQ mode transaction. |
| FILLER = Burst Filler | Variable | All filler bits are set zero. |
| CRC = Cyclic Redundancy Code | 16 | Same Generator polynomial as IS-54B (includes DVCC) |

According to the present invention, a mobile station (MS) can be in a plurality of states. A mobile station shall be in the "start random access" state before the first unit of a message that is to be transmitted by a random access has been transmitted. The mobile station shall be in the "start reserved access" state before the first unit of a message that is to be transmitted by a reservation based access has been transmitted. The mobile station shall be in the "more units" state if there are more units associated with the current access event yet to be transmitted. The mobile station shall be in the "after last burst" state if the last unit of an access event has been transmitted. Finally, the mobile station shall be in the "success" state after a complete message has been sent successfully.

The layer 2 protocol is also controlled by a plurality of flags. Forward shared channel feedback (SCF) flags are used to control transmissions on the RACH. A busy/reserved/idle (BRI) flag is used to indicate whether its corresponding uplink RACH slot is Busy, Reserved or Idle. Six bits are used for these flags and the different conditions are encoded as shown in the table below:

|  | $BRI_5$ | $BRI_4$ | $BRI_3$ | $BRI_2$ | $BRI_1$ | $BRI_0$ |
| --- | --- | --- | --- | --- | --- | --- |
| Busy | 1 | 1 | 1 | 1 | 0 | 0 |
| Reserved | 0 | 0 | 1 | 1 | 1 | 1 |
| Idle | 0 | 0 | 0 | 0 | 0 | 0 |

A received/not received (R/N) flag is used to indicate whether or not the base station received the last transmitted burst. A five times repetition code is used for encoding this flag as shown in the table below:

|  | $R/N_4$ | $R/N_3$ | $R/N_2$ | $R/N_1$ | $R/N_0$ |
| --- | --- | --- | --- | --- | --- |
| Received | 1 | 1 | 1 | 1 | 1 |
| Not Received | 0 | 0 | 0 | 0 | 0 |

According to the present invention, partial echo (PE) information is used to identify which MS was correctly received after the initial burst of random access has been sent or which MS is intended to have access to a reserved RACH slot. For example, the seven least significant bits LSBs of an IS-54B MIN can be used as partial echo information.

The following table shows how a mobile station decodes received flags according to its Layer 2 state. Note that only the flags relevant to its Layer 2 state are shown. In the "Start random access" state, the BRI flag is the only relevant flag. During a multiburst message transmission both the BRI and R/N flags are relevant. In the summations in the following table, $b_i$ equals the bit value.

| Layer 2 State | Busy/Reserved/Idle | | | Received/Not Received | |
| --- | --- | --- | --- | --- | --- |
|  | Busy | Reserved | Idle | Received | Not received |
|  | 111100 | 001111 | 000000 | 11111 | 00000 |
| Start random access | Idle IF $\sum_{i=1}^{4} b_i < 2$ AND $\sum_{i=3}^{6} b_i < 2$ | | | N/A | N/A |

-continued

| Layer 2 State | Busy/Reserved/Idle | Received/Not Received | |
|---|---|---|---|
| Start reserved access | Reserved IF < 3 bits difference to Reserved flag code value | N/A | N/A |
| More units | Busy IF < 4 bits difference to Busy flag code value | $\sum_{i=1}^{5} b_i \geq 4$ | $\sum_{i=1}^{5} b_i < 4$ |
| After last burst | Busy IF < 4 bits difference to Busy flag code value | $\sum_{i=1}^{5} b_i \geq 4$ | $\sum_{i=1}^{5} b_i < 4$ |

The mobile station interprets a received coded partial echo (CPE) value as having been correctly decoded if it differs by less than 3 bits from the correctly coded partial echo. This is referred to as PE match.

A mobile station is allowed a maximum of Y+1, where Y=(0 ... 7), access attempts before considering the attempt to transfer a message as a failure. The random delay period used by a mobile station after not finding BRI=Idle when ready to send the first burst of an access attempt or after a transmission attempt failure, is uniformly distributed between 0 and 200 ms with a granularity of 6.667 ms (the length of a time slot). A mobile station is not allowed to make more than Z, where Z=(0 ... 3), consecutive repetitions of an individual burst during an access attempt.

When a mobile station is in the start "random access" state, it looks at BRI information in the first occurrence of a downlink DCC slot, regardless of the sub channels of the current DCC. If the mobile station finds BRI=Idle, it sends the first burst unit of its message in the corresponding sub channel uplink RACH. If BRI=Busy or Reserved, the mobile station generates a random delay time. After the random delay time has expired the mobile shall repeat the foregoing procedure. The search for BRI=Idle is to be repeated a maximum of X+1 times, where X=(0 ... 9), for each transmission attempt. With the exception of an origination, the MS still monitors its PCH during random access procedures.

When a mobile station is in the "start reserved access" state, it looks at BRI and PE information in all downlink slots of the current DCC, regardless of subchannels, for a slot where BRI=Reserved and a PE match occurs, which will be explained below. The base station (BS) can assign a reserved slot for a given mobile station MS regardless of which subchannel the MS may have previously used. If a mobile station finds this slot, it sends the first unit of its message in the corresponding uplink RACH subchannel. If the mobile station does not find this slot within a predetermined time-out period (T), it enters the "start random access" state. After the first burst of a random access has been transmitted, the mobile reads the partial echo field in the next downlink slot of the current DCC that corresponds to its RACH subchannel. If a PE match is found and R/N=1, the mobile assumes that the first burst of its access attempt has been correctly received by the BS and then enters either the "after last burst" state or the "more units" state. If the mobile does not find a PE match, it generates a random delay time and enters the "start random access" state.

If the mobile station has additional bursts to send, it enters the "move units" state and then checks R/N after sending each of these bursts. If the mobile station finds that R/N=Received after sending a burst, it considers that burst as correctly received by the BS; otherwise, it considers the burst as not received by the BS. If the mobile station finds that BRI=reserved or idle, it also considers the burst as not received by the BS. If more than S+1, where S=(0,1), consecutive Not Busy readings of BRI are made by the mobile, it aborts the transmission of the message and starts another transmission attempt after a random delay. If a given burst is considered to be received, the mobile transmits the next burst of the message in the next slot of the subchannel. If a burst is found to be not received, the mobile retransmits it.

The mobile reads the SCF flags of the currently used subchannel after it has transmitted the last burst of its current access attempt. If R/N=Received, the MS considers the message to have been correctly transmitted. If R/N=Not Received and BRI=Reserved or Idle, the MS considers the last burst as not received. If more than S+1, where S=(0,1), consecutive combined R/N=Not Received and BRI=Not Busy readings are made by the mobile station, it aborts the transmission of the message and starts another transmission attempt after a random delay. If R/N=Not Received and BRI=Busy, the mobile re-transmits the last transmitted burst.

Figure 6A:
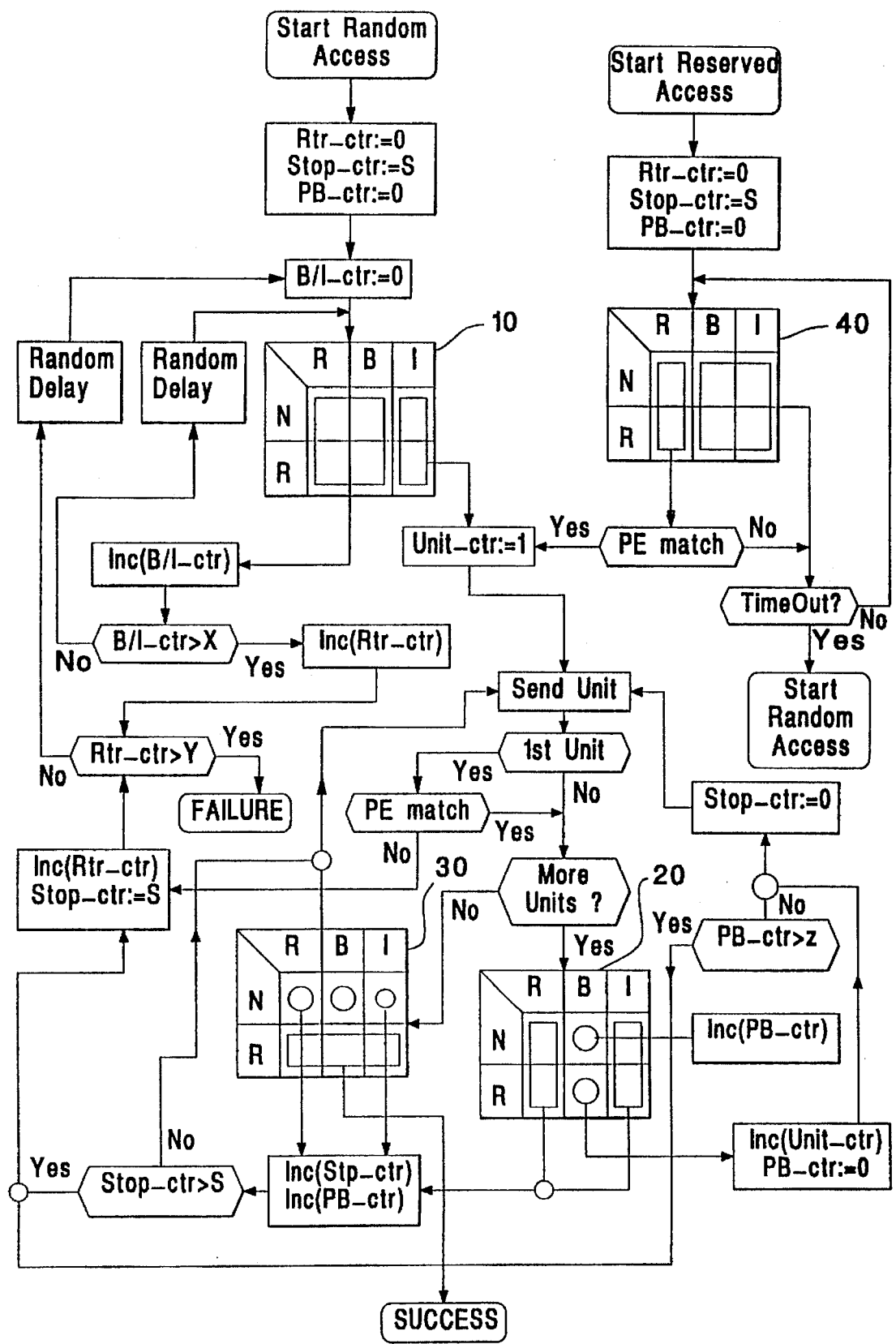
FIGS. 6a–b illustrate the Random Access Procedures for a base station and a mobile station according to one embodiment of the present invention.
Figure 6B:
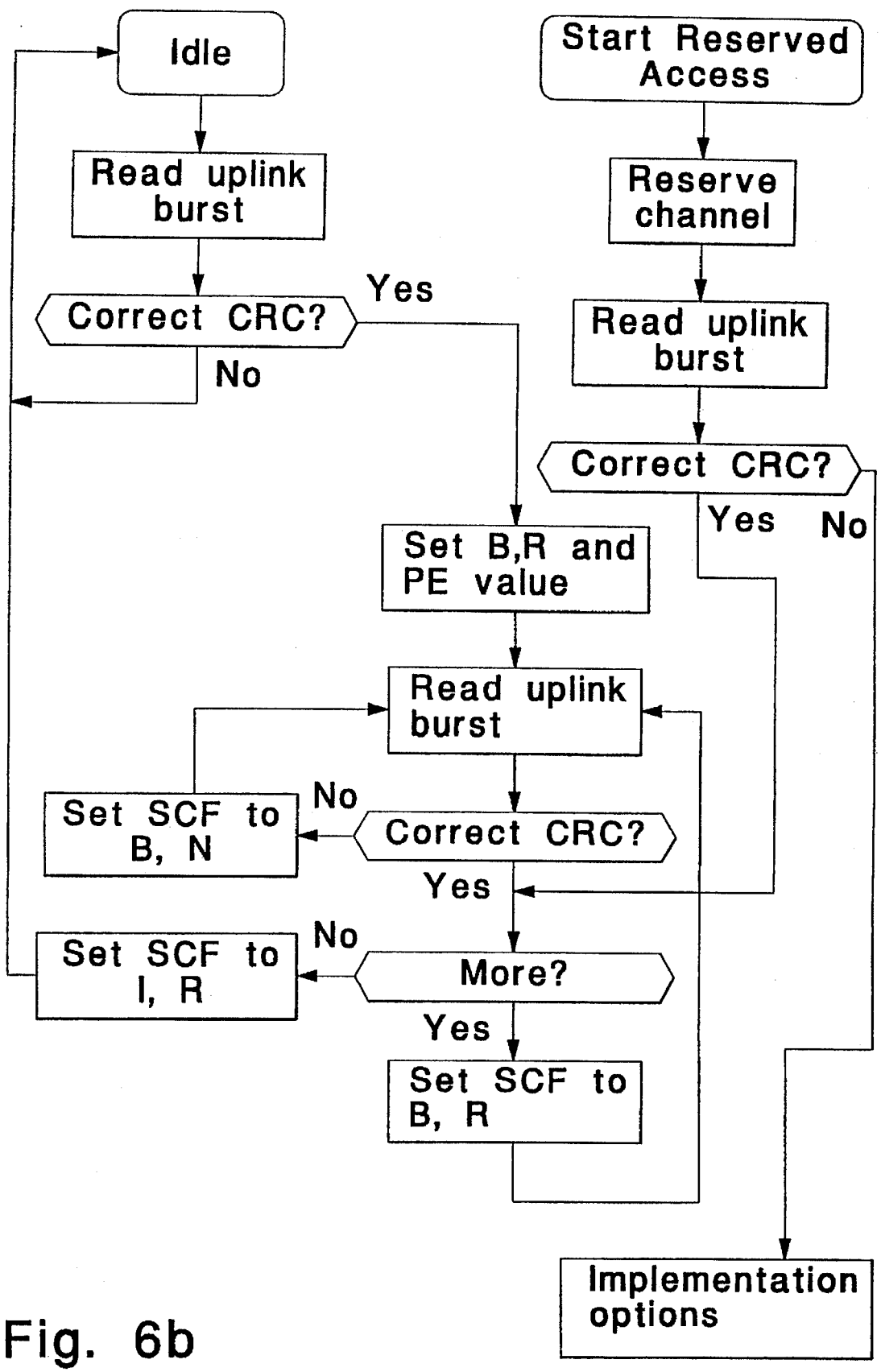

The foregoing random access procedures are illustrated in FIGS. 6a–b. FIG. 6a illustrates the random access procedure for a mobile station while FIG. 6b illustrates the random access procedure for a base station. Set forth below is an itemized description of the use of the truth table in the flow chart shown in FIG. 6a:

1. The truth table is examined at start of a contention based access at block 10. If BRI="Reserved" or "Busy" the mobile station shall increment the Busy/Idle counter and then compare it to X. If BRI="Idle" the mobile station shall set Unit_ctr to 1 and send the first burst of its access attempt.

2. The truth table is examined after sending any given intermediate burst of an access attempt with at least one more burst pending at block 20. If BRI="Idle" or "Reserved" the mobile station shall increment Stop_ctr and PB_ctr and then compare Stop_ctr to S. If BRI="Busy" and RUN="Not Received" the mobile station shall increment PB_ctr and then compare it to Z. If BRI="Busy" and R/N="Received" the mobile station shall increment Unit_ctr and set PB_ctr to zero.

3. The truth table is examined after sending the last burst of an access attempt at block 30. If R/N="Received" then the mobile station shall consider the message as successfully sent. If BRI="Reserved" and R/N="Not Received" the mobile station shall increment Stop_ctr and PB_ctr and then compare Stop_ctr to S. If BRI="Busy" and RUN="Not Received" the mobile station shall resend the last burst of the access attempt.

4. The truth table is examined at the start of a reservation based access at block 40. If BRI="Busy" or "Idle" then the mobile station examines the reservation timer. If BRI="Reserved" and the PE does not match then the mobile station examines the reservation timer. If BRI="Reserved" and the PE does match then the mobile station shall set Unit_ctr to 1 and send the first burst of the access attempt.

Figure 7A:
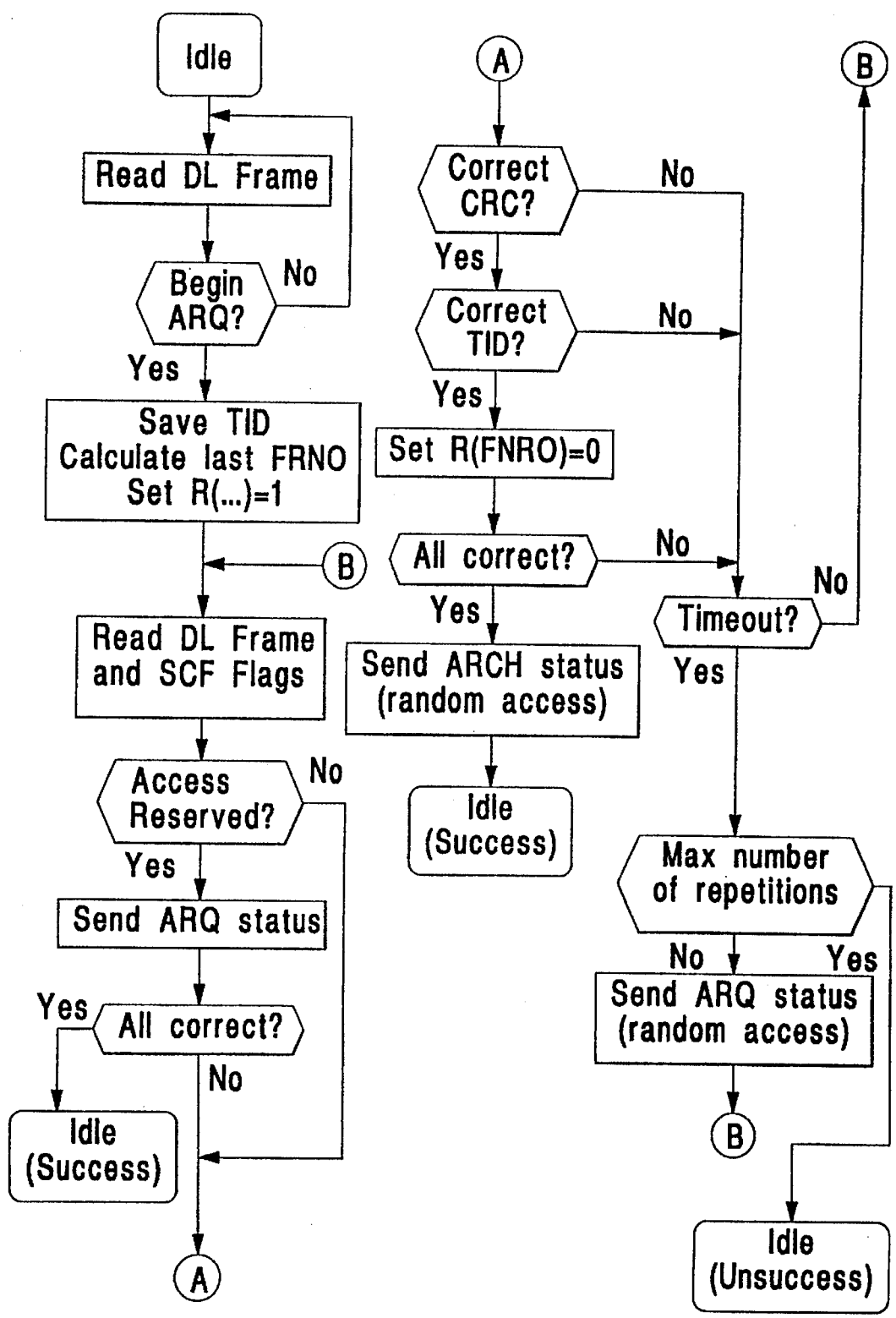
FIGS. 7a–b illustrate a SPACH ARQ Mode Procedure for a mobile station and a base station according to one embodiment of the present invention.
Figure 7B:
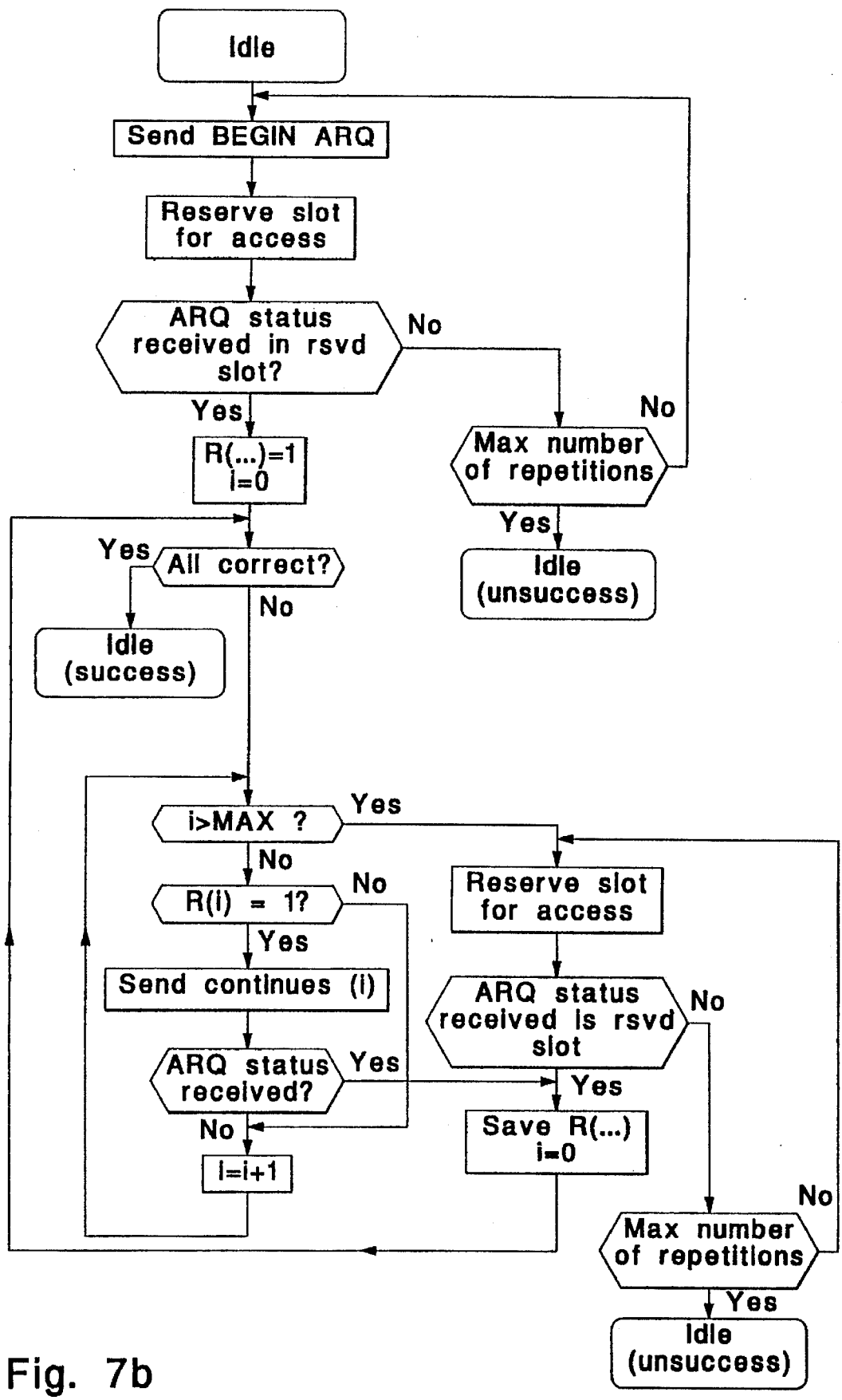

According to one embodiment of the present invention, a unique method for determining the status of frames sent to a mobile station is disclosed and is illustrated in FIGS. 7a–b. The BMI (base station, mobile services switching center and internetworking function) starts an Automatic Retransmission Request (ARQ) mode transaction by sending an ARQ Mode BEGIN frame which is illustrated in FIG. 8. The ARQ Mode BEGIN frame is used to start the delivery of a L3 ARCH or SMSCH message in the ARQ mode. If the L3 message is too long to fit into a single ARQ Mode BEGIN frame, then the remaining L3 information is carried using additional ARQ Mode CONTINUE frames as necessary. If the L3 message does fit within a single ARQ Mode BEGIN frame, it is padded with filler as necessary. The ARQ Mode Begin frame contains a Header A and a Header B which in turn contain various layer 2 overhead information. In this example, the Header A section has identified this frame as a point-to-point SMS channel, however the present invention is not limited thereto. The ARQ Mode BEGIN frame contains a Mobile station identity (MSID) and a Partial Echo (PE) field which is set to some value, for example, the 7 least significant bits of the mobile station's IS-54B mobile identification number (MIN). A transaction identifier (TID) field is included and uniquely identifies which instance of an ARQ mode transaction is being sent to a mobile station. The PE field in conjunction with the transaction identifier TID identifies the transaction initiated by the ARQ Mode BEGIN frame and serves to associate any subsequent ARQ Mode CONTINUE frames with the same transaction. A L3 length indicator (L3LI) field is used by the mobile station to calculate the number of ARQ Mode CONTINUE frames which will follow the ARQ Mode BEGIN frame. Finally, the ARQ Mode Begin frame contains a layer 3 data field (L3DATA).

As a result of sending an ARQ Mode BEGIN frame, the BMI may wait for an acknowledgement from the mobile station since this frame contains information pertaining to the potential success of an ARQ Mode transaction. If the BMI decides not to wait for a mobile station acknowledgement, it shall proceed to send an ARQ Mode CONTINUE frame which will be described below. However if the BMI decides to wait for an acknowledgement, the BMI shall proceed as follows. For the case of soliciting a reservation based acknowledgement in a given downlink slot, the BMI polls the mobile station by setting the BRI flag (part of the SCF) to "Reserved" and by setting the PE field (part of the SCF) to the value corresponding to the target mobile station. The BMI then waits for an uplink ARQ Status frame on the same access path on which it polled the mobile station. If an ARQ Status message is not received on the reserved access slot or is received but with an incorrect indication of outstanding frames, the BMI shall resend the ARQ Mode BEGIN frame up to a predetermined number of times. If the BMI does not receive a correct ARQ Status message after a certain number of attempts, it shall terminate the ARQ Mode transaction. If the BMI does receive a correct ARQ Status frame after a certain number of attempts, it shall proceed to send an ARQ Mode CONTINUE frame.

The BMI sends as many ARQ Mode CONTINUE frames as necessary to complete the initiated ARQ Mode transaction. The ARQ Mode CONTINUE frame, which is illustrated in FIG. 9, contains the Partial Echo (PE) field and a transaction identifier (TID) which together uniquely identify which instance of an ARQ mode transaction is being sent to the mobile station. The ARQ Mode CONTINUE frame also includes a Continuation Frame Number (FRNO) field which identifies individual continuation frames, and a portion of the L3 data (L3DATA). An ARQ Mode BEGIN frame has an implicit frame number FRNO value of 0 associated with it whereas ARQ Mode CONTINUE frames have explicit FRNO values which start at 1 and range from 1 to 31. The FRNO value is incremented for each new ARQ Mode CONTINUE frame sent by the BMI to a MS in support of a specific ARQ Mode transaction.

The BMI may poll the mobile station while sending any intermediate ARQ Mode CONTINUE frame. If the BMI decides to issue an intermediate poll it shall proceed as follows. In a given downlink slot the BMI sets the BRI flag to "Reserved" and sets the PE field to the value corresponding to the target mobile station. The BMI then waits for an uplink ARQ Status message on the same access path on which it polled the mobile station. If an ARQ Status message is not received on the reserved access slot, the BMI resends the current ARQ Mode CONTINUE frame up to a predetermined number of times. If the BMI does not receive a correct ARQ Status frame after a certain number of attempts, the BMI terminates the ARQ Mode transaction. If the BMI does receive a correct ARQ Status frame after a certain number of attempts, it continues to send ARQ Mode CONTINUE frames that have not yet been correctly received by the mobile station. When the BMI sends the last ARQ Mode CONTINUE frame, the BMI proceeds in a manner described below.

The BMI polls the mobile station while sending the last ARQ Mode CONTINUE frame as follows. For the case of soliciting a reservation based acknowledgement in a given downlink slot, the BMI sets the BRI flag to "reserved" and sets the PE field to the value corresponding to the target mobile station. The BMI then waits for an uplink ARQ Status frame on the same access path on which it polled the mobile station. If an ARQ Status frame is not received on the reserved access slot, the BMI resends the current ARQ Mode CONTINUE frame up to a predetermined number of times. If the BMI does not receive a correct ARQ Status frame after a certain number of attempts, the BMI terminates the ARQ Mode transaction. If the BMI does receive an ARQ Status frame and the FRNO MAP indicates "all correct", the ARQ Mode transaction is considered to be successfully completed. If the BMI does receive an ARQ Status frame and the FRNO MAP does not indicate "all correct", the BMI resends those ARQ Mode CONTINUE frames that have not yet been correctly received by the mobile station. The BMI resends any given ARQ Mode CONTINUE frame up to a predetermined maximum number of times before terminating the ARQ Mode transaction.

The operation of the SPACH ARQ mode for the mobile station will now be described. After a mobile station has successfully completed transmission of a message on the RACH (as indicated by the SCF flags), it reads up to a predetermined number of SPACH frames beginning 40 ms after successfully completing the RACH message transmission. When the mobile station receives an ARQ Mode BEGIN frame with a MSID matching its own, it proceeds as follows. The mobile station stores the TID for ARQ Mode transaction identification purposes. The number of pending ARQ Mode CONTINUE frames can then be calculated based on the received L3LI. The FRNO MAP, which is a bit map, is set to RECEIVED for FRNO zero (corresponding to the ARQ Mode BEGIN) and NOT RECEIVED for all pending ARQ Mode CONTINUE frames. According to one embodiment of the present invention, a 1 can be used to signify that a frame has been received and a 0 can be used to signify that a frame has not been received. The FRNO MAP supports BMI transmissions up to 32 ARQ Mode frames in length (1 BEGIN frame and 31 CONTINUE frames). The portion of the L3 message carried in L3DATA shall be stored. The mobile station then proceeds as described in the next section. Of course those skilled in the art will readily appreciate that the FRNO bit map could be expanded or reduced so as to support a greater or fewer number of frames transmitted from the BMI.

The mobile station shall read SPACH frames and respond as follows. If a poll occurs, i.e., a PE match occurs along with the BRI flag set to "Reserved", the mobile station sends an ARQ Status frame to the BMI with a FRNO MAP that indicates the reception status of all ARQ frames correctly received to that point of the current ARQ mode transaction. If the FRNO MAP indicates that an "all correct" condition exists, the mobile station considers the corresponding ARQ Mode transaction to be successfully completed. Otherwise, if an ARQ Mode CONTINUE frame is correctly received for an outstanding ARQ Mode transaction (i.e., PE and TID sent in the ARQ Mode CONTINUE frame match) the mobile station stores the L3DATA contained therein and sets the corresponding FRNO MAP position to RECEIVED. If no ARQ Mode CONTINUE frame or poll is received for a predetermined period, the mobile station can autonomously transmit an ARQ Status frame using a contention based random access. A maximum number of such autonomous ARQ Status frame transmissions may be sent before the corresponding ARQ Mode transaction is terminated.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A method for obtaining a report on the status of frames comprising a message transmitted to a remote station, comprising the steps of:

transmitting said message to said remote station from a base station using layer 2 frames;

sending a status request to said remote station from the base station using a layer 2 bit which is distinct from layer 2 bits used to carry the message; and sending a status report to said base station, wherein said status request contains a second layer 2 bit which specifies whether the remote station should send the status report on a reservation basis or on a contention basis.

2. A method according to claim 1, wherein said layer 2 information is the Busy/Reserved/Idle portion of shared channel feedback information.

3. A method according to claim 1, wherein said status request uses layer 2 information to identify said remote station to which said status request is being sent.

4. A method according to claim 3, wherein said layer 2 information is a partial echo (PE) portion of shared channel feedback information.

5. A base station for use in a cellular communication system, comprising:

means for transmitting a message to a mobile station using layer 2 frames;

means for transmitting a status request to the mobile station using a layer 2 bit which is distinct from layer 2 bits used to carry the message;

means for receiving a status report from said mobile station in response to said status request, wherein said status request contains a second layer 2 bit which specifies whether the mobile station should send the status report on a reservation basis or on a contention basis.

6. A base station according to claim 5, wherein said layer 2 information is a busy/reserved/idle portion of shared channel feedback information.

7. A mobile station for use in a cellular communication system, comprising:

means for receiving a message from said cellular system which is transmitted using layer 2 frames;

means for receiving a status request from said cellular system which is transmitted using a layer 2 bit which is distinct from layer 2 bits used to carry the message;

means for transmitting a status report to said cellular system in response to said status request, wherein said status request contains a second layer 2 bit which specifies whether the mobile station should send the status report on a reservation basis or on a contention basis.

8. A mobile station according to claim 7, wherein said layer 2 information is a busy/reserved/idle portion of shared channel feedback information.

9. A mobile station according to claim 7, wherein said mobile station transmits said status report to a base station in said cellular system.

10. A mobile station according to claim 7, wherein said status request includes layer 2 information to indicate which mobile station is being sent a status request.

11. A mobile station according to claim 10, wherein said layer 2 information are a partial echo portion of shared channel feedback information.

* * * * *